United States Patent
Kim et al.

(10) Patent No.: US 6,314,211 B1
(45) Date of Patent: Nov. 6, 2001

(54) APPARATUS AND METHOD FOR CONVERTING TWO-DIMENSIONAL IMAGE SEQUENCE INTO THREE-DIMENSIONAL IMAGE USING CONVERSION OF MOTION DISPARITY INTO HORIZONTAL DISPARITY AND POST-PROCESSING METHOD DURING GENERATION OF THREE-DIMENSIONAL IMAGE

(75) Inventors: Man-bae Kim, Chuncheon; Mun-sup Song, Yongin; Do-kyoon Kim, Sungnam, all of (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/222,713

(22) Filed: Dec. 29, 1998

(30) Foreign Application Priority Data

Dec. 30, 1997 (KR) .................................................. 97-77734
Dec. 30, 1997 (KR) .................................................. 97-77736
Jan. 21, 1998 (KR) .................................................... 98-1722

(51) Int. Cl.⁷ ........................................................ G06K 9/36
(52) U.S. Cl. ............................................. 382/285; 348/42
(58) Field of Search ..................................... 382/285, 294, 382/278, 154, 236, 284; 348/42; 345/419, 425

(56) References Cited

U.S. PATENT DOCUMENTS

| | | | |
|---|---|---|---|
| 5,619,256 | * 4/1997 | Haskell et al. | 348/43 |
| 5,682,437 | * 10/1997 | Okino et al. | 382/100 |
| 5,808,664 | * 9/1998 | Yamashita et al. | 348/42 |
| 6,043,838 | * 3/2000 | Chen | 348/42 |

FOREIGN PATENT DOCUMENTS

| | | |
|---|---|---|
| HEI 8-289328 | 11/1996 | (JP) . |
| 9-81746 | 3/1997 | (KR) . |
| 97-58060 | 7/1997 | (KR) . |

* cited by examiner

Primary Examiner—Yon J. Couso
(74) Attorney, Agent, or Firm—Burns, Doane, Swecker & Mathis, L.L.P.

(57) ABSTRACT

An apparatus and a method for converting a two-dimensional image sequence into a three-dimensional image using a conversion of a motion disparity into a horizontal disparity and a post-processing method during the generation of a three-dimensional image are provided. The apparatus for converting a two-dimensional image sequence into a three-dimensional image according to the present invention includes a block motion measuring portion for measuring a motion vector for each block of a current image divided into blocks having a predetermined size using a previous image frame, a horizontal disparity generating portion for obtaining a horizontal disparity from the motion vector of each block according to the motion characteristic of the current image, an image generating portion for moving each block in a horizontal direction according to each horizontal disparity and generating a composite image corresponding to the current image, and an outputting portion for displaying a three-dimensional image formed of the current image and the composite image.

32 Claims, 14 Drawing Sheets

FIG. 5
(a)
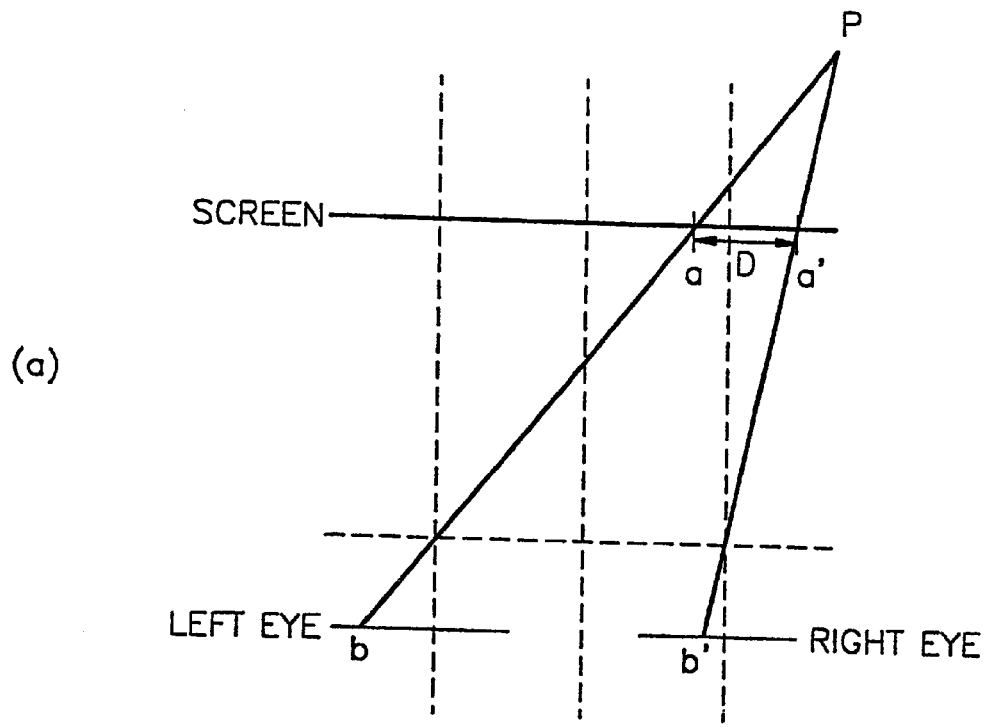
(b)
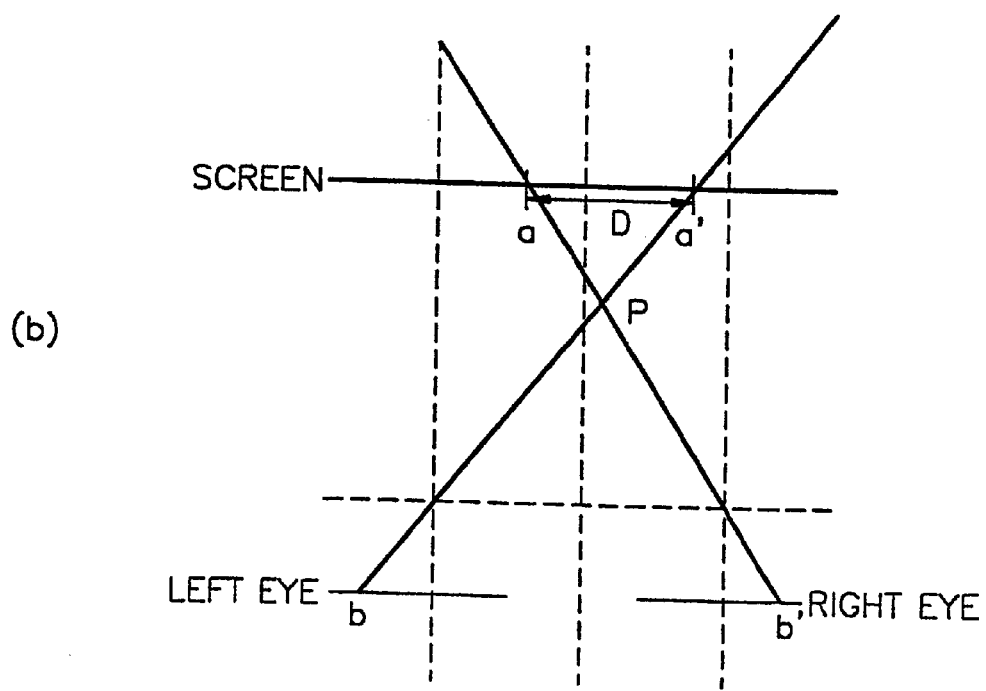

FIG. 7A

| $e^{-4}$ | $e^{-3}$ | $e^{-2}$ | $e^{-3}$ | $e^{-4}$ |
|---|---|---|---|---|
| $e^{-3}$ | $e^{-2}$ | $e^{-1}$ | $e^{-2}$ | $e^{-3}$ |
| $e^{-2}$ | $e^{-1}$ | 1 | $e^{-1}$ | $e^{-2}$ |
| $e^{-3}$ | $e^{-2}$ | $e^{-1}$ | $e^{-2}$ | $e^{-3}$ |
| $e^{-4}$ | $e^{-3}$ | $e^{-2}$ | $e^{-3}$ | $e^{-4}$ |

FIG. 7B

| 0 | 0 | $e^{-1.25}$ | 0 | 0 |
|---|---|---|---|---|
| 0 | $e^{-2}$ | $e^{-0.7}$ | $e^{-2}$ | 0 |
| $e^{-2}$ | $e^{-1}$ | 1 | $e^{-1}$ | $e^{-2}$ |
| 0 | $e^{-2}$ | $e^{-0.7}$ | $e^{-2}$ | 0 |
| 0 | 0 | $e^{-1.25}$ | 0 | 0 |

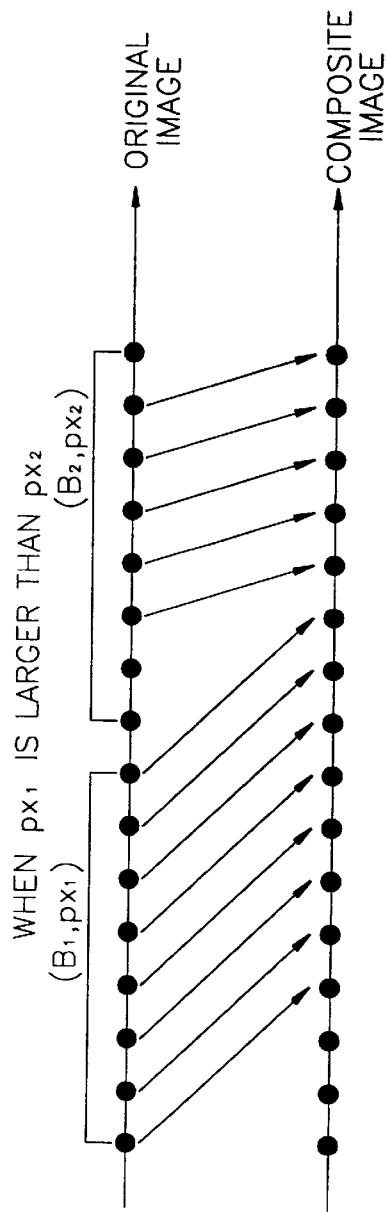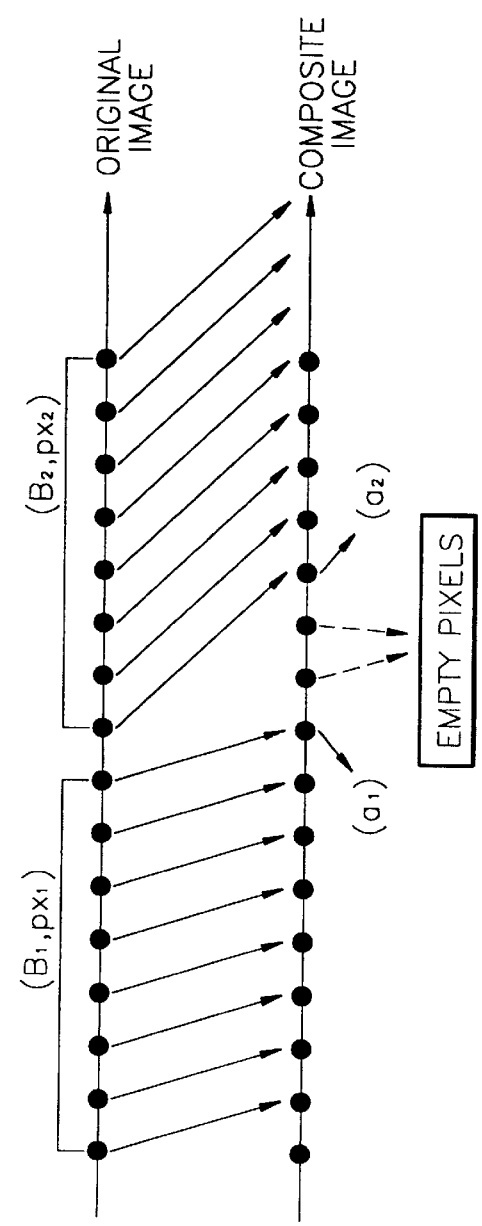

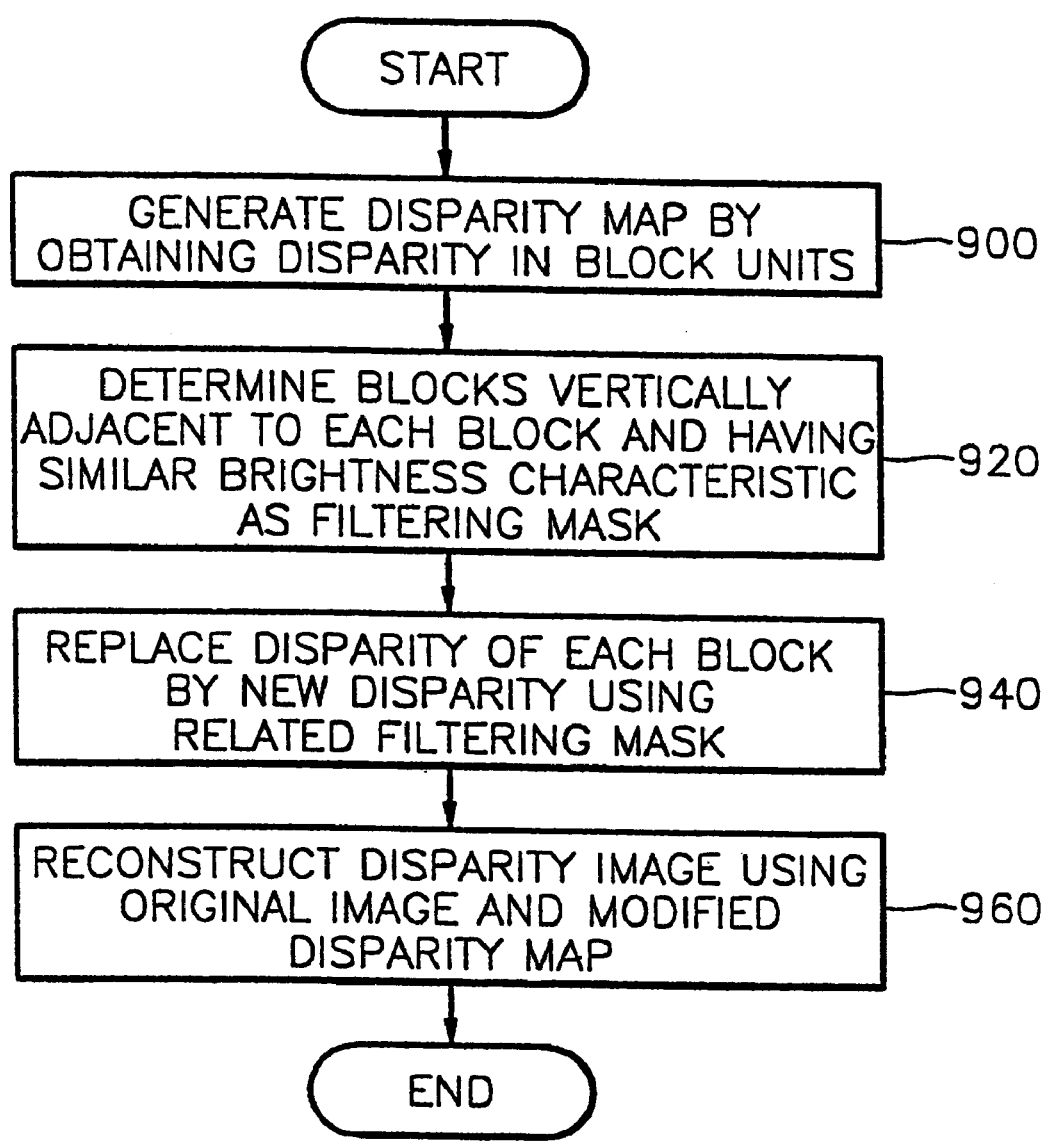

APPARATUS AND METHOD FOR CONVERTING TWO-DIMENSIONAL IMAGE SEQUENCE INTO THREE-DIMENSIONAL IMAGE USING CONVERSION OF MOTION DISPARITY INTO HORIZONTAL DISPARITY AND POST-PROCESSING METHOD DURING GENERATION OF THREE-DIMENSIONAL IMAGE

BACKGROUND OF THE INVENTION

1. Field of the Invention

The present invention relates to an apparatus and a method for generating a three-dimensional image, and more particularly, to an apparatus and a method for converting a two-dimensional image sequence into a three-dimensional image using the motion of the two-dimensional image sequence and post-processing method during the generation of a three-dimensional image.

2. Description of the Related Art

FIG. 1 is a flowchart for describing a conventional method for generating a three-dimensional image using a modified time difference.

Sanyo Electronics Co. Ltd. has developed a method using a modified time difference (MTD) in the conventional method for generating the three-dimensional image. Referring to FIG. 1, a moved region is extracted from the two dimensional image sequence (step 100). The moving speed and direction of the extracted area are extracted (step 110). A delay direction and a delay time are determined from a previous image frame based on the moving speed and direction of a current image (step 120). Then, a determination is made as to which eye a delayed image and the current image are respectively displayed according to the determined delay direction and delay time (step 130).

FIG. 2 describes processes of determining left/right images in the method described in FIG. 1. To be more specific, FIG. 2 describes processes of determining the left/right images when a camera for capturing the images of the two-dimensional image sequence is fixed and a subject ■ in an image moves. According to the conventional method using the MTD, a binocular disparity is provided to a person by showing the image time delayed in the left eye shown in FIG. 2. A binocular disparity opposite to the above-mentioned one is provided by showing an original image to the left eye and the time delayed image to the right eye when the subject ■ moves to the left.

The conventional method for generating the three-dimensional image using the MTD has the following problems.

First, since an image is selected as the delayed image among previous frames based on only motion information of the original image, other depths of the respective regions of the original image are ignored. As a result, a sense of depth cannot be felt and a cubic effect can be felt in a moving subject. However, it is not possible to feel the cubic effect in a subject which barely moves such as the background of a screen.

Second, when the motion of a subject has a vertical component between the original image and the delayed image, if the three-dimensional image is generated by the conventional method using the MTD, the viewer's eyes become tired due to the visual structure of humans in which a sense of depth is obtained by a horizontal disparity.

Third, when the motion vector of a subject in the original image is very large, even if a frame is selected as the delayed image from a plurality of previous frames, the disparity of the stereo-image generated by the original image and the delayed image is beyond the limits of humans to perceive disparity.

In general, in the method for generating the three-dimensional image from the two dimensional image sequence, the two-dimensional image sequence photographed by a single eyed video camera and another image corresponding thereto are used. Here, how another image is made is important. If the quality of the made image is deteriorated, for example, the real motion of the subject in a single eyed image is not described well and the boundary of the subject is broken, a natural three-dimensional image is not generated.

SUMMARY OF THE INVENTION

It is an object of the present invention to provide an apparatus for converting a two dimensional image sequence into a three dimensional image using a conversion of a motion disparity into a horizontal disparity by which it is possible to generate a new image by measuring the motion of the two-dimensional image sequence and converting the motion into the horizontal disparity according to the characteristics of the motion, thus generating a three-dimensional image in which a sense of depth is felt in each region of the image, a natural cubic effect is felt even if the motion of a subject in an original image has a vertical component, and the motion vector of the subject in the original image can be perceived by the human disparity no matter how large it is.

It is another object of the present invention to provide a three-dimensional image converting method performed by the three-dimensional image converting apparatus.

It is still another object of the present invention to provide a post processing method during generation of the three-dimensional image using the two-dimensional image sequence by which it is possible to improve the quality of a disparity image and to generate a natural stereo-image by discriminating the presence of the same subjects in adjacent blocks using brightness characteristics for the respective blocks in the original image have and post-processing the disparity image according to the discrimination result.

Accordingly, to achieve the first object, there is provided an apparatus for converting a two-dimensional image sequence into a three-dimensional image, comprising a block motion measuring portion for measuring a motion vector for each block of a current image divided into blocks having a predetermined size using a previous image frame, a horizontal disparity generating portion for obtaining a horizontal disparity from the motion vector of each block according to the motion characteristic of the current image, an image generating portion for moving each block in a horizontal direction according to each horizontal disparity and generating a composite image corresponding to the current image, and an outputting portion for displaying a three-dimensional image comprised of the current image and the composite image.

To achieve the second object, there is provided a method for converting a two-dimensional image sequence into a three-dimensional image, comprising the steps of (a) dividing an input current image into blocks having a predetermined size, (b) measuring a motion vector for each block of the current image using a previous image frame, (c) obtaining a horizontal disparity from the motion vector of each block according to the motion characteristic of the current image, (d) generating a composite image corresponding to the current image by moving each block in a horizontal direction according to the each horizontal disparity, and (e) displaying a three-dimensional image formed of the current image and the composite image.

To achieve the third object, there is provided a method for post-processing a displacement image made by extracting the motion of an original image in a system for generating a stereo image using a single eyed image sequence, comprising the steps of (a) obtaining the disparity of each block of the original image divided into blocks having a predetermined size using the disparity image and a maximum disparity and generating a disparity map comprised of disparities of all the blocks, (b) comparing brightness characteristics between each block and vertically adjacent blocks and determining the group of block having similar brightness characteristics to be the filtering mask, (c) replacing the disparity of each block by a new disparity obtained from blocks in the concerned filtering mask and modifying the disparity map, and (d) reconstructing the disparity image using the original image and the modified disparity map.

BRIEF DESCRIPTION OF THE DRAWINGS

The above objects and advantages of the present invention will become more apparent by describing in detail a preferred embodiment thereof with reference to the attached drawings in which:

FIGS. 5A and 5B describe the principle of a binocular disparity;

FIGS. 7A and 7B show examples of applying weighted values to adjacent blocks in a process of normalizing an estimated motion;

FIGS. 8A and 8B describe processes of horizontally moving blocks in the method of FIG. 4;

FIG. 9 is a flowchart describing a post-processing method according to the present invention;

DESCRIPTION OF THE PREFERRED EMBODIMENTS

Hereinafter, the structure and operation of the apparatus for converting a two-dimensional image sequence into a three-dimensional image according to the present invention will be described as follows with reference to the attached drawings.

Figure 1:
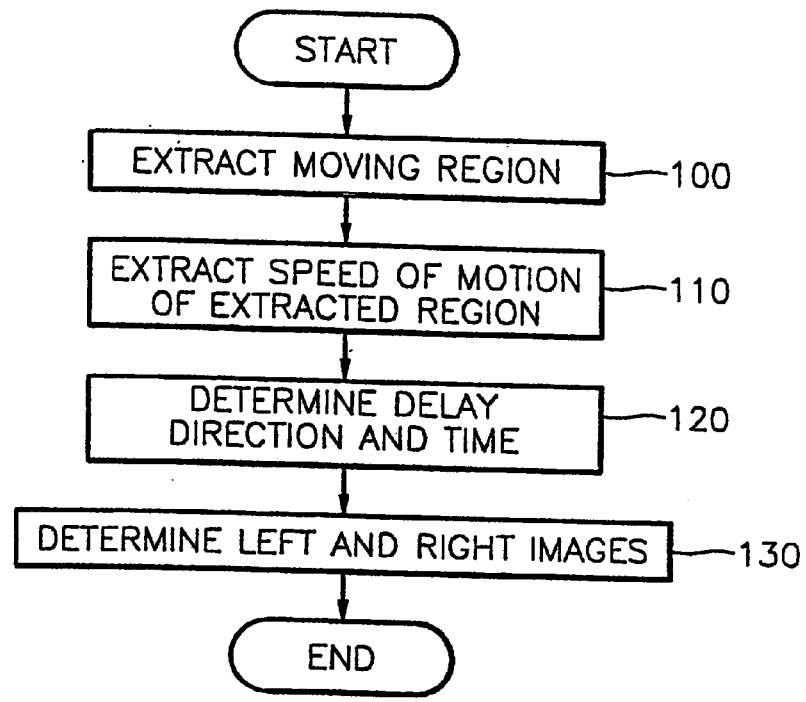
FIG. 1 is a flowchart for describing a conventional three-dimensional image generating method using a modified time difference (MTD)
Figure 2:
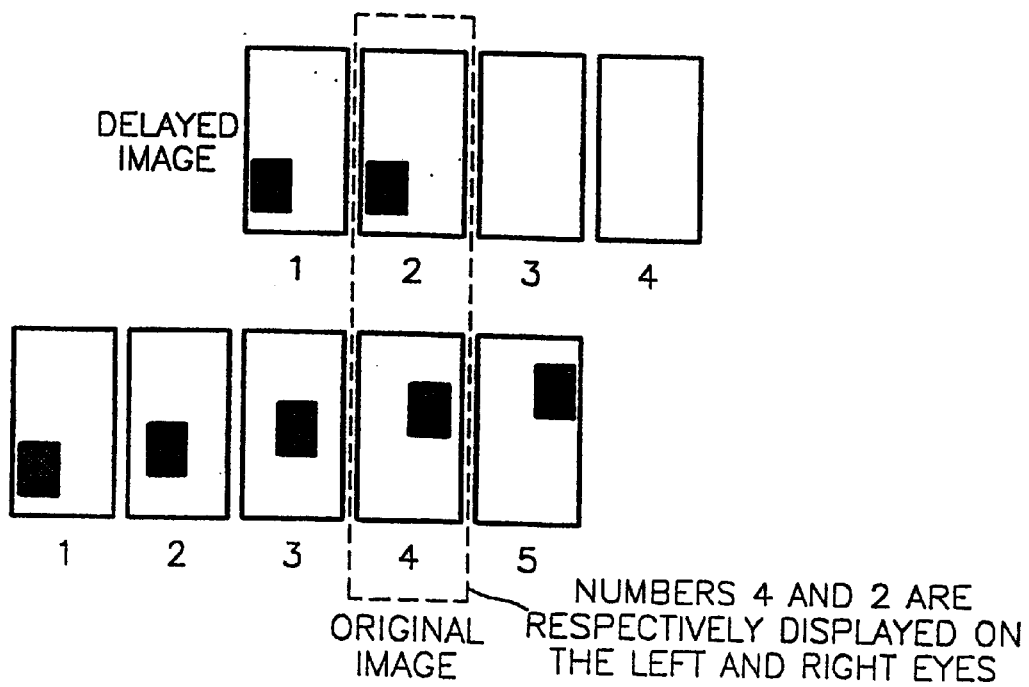
FIG. 2 describes processes of determining left/right images in the method shown in FIG. 1.
Figure 3:
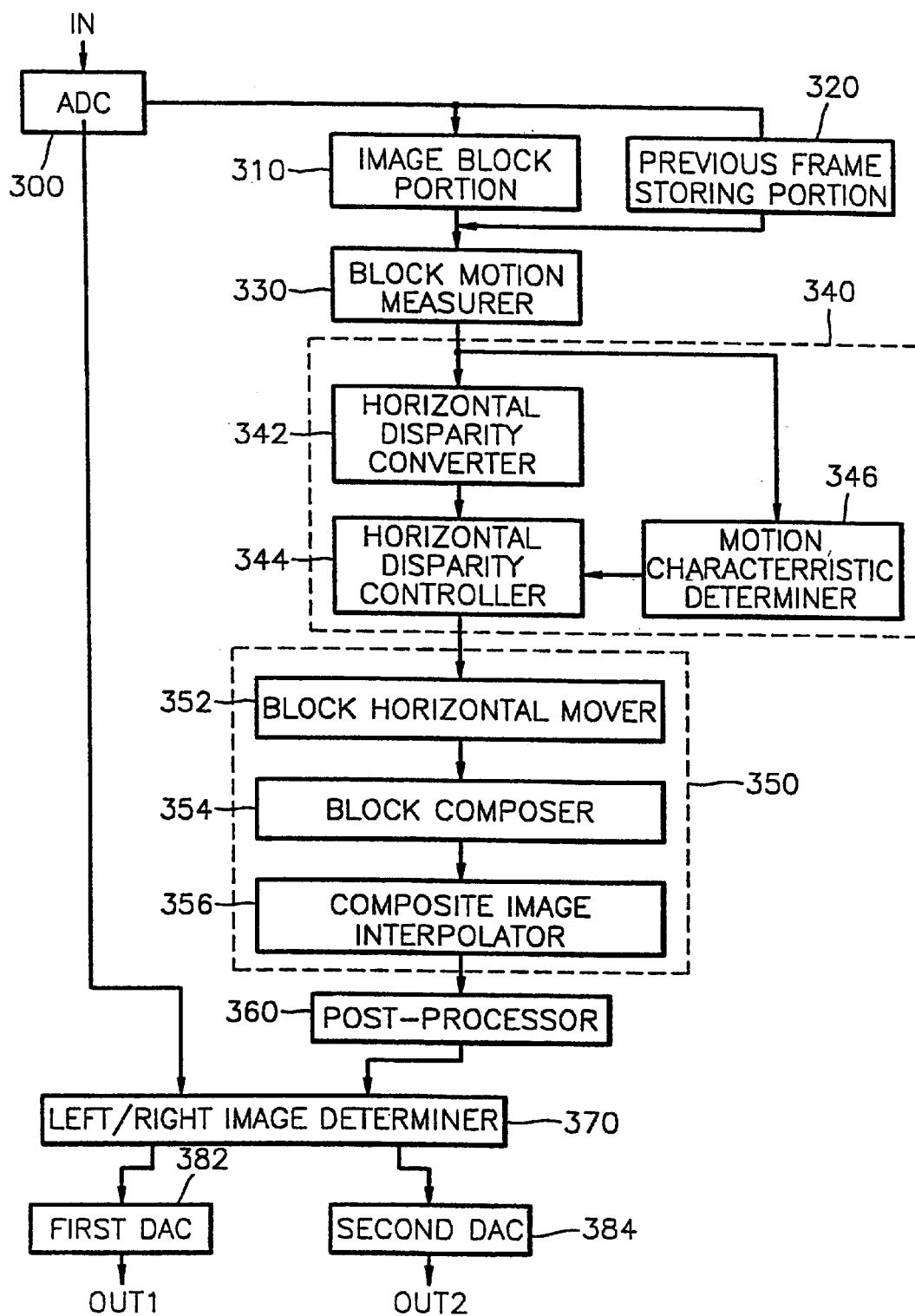
FIG. 3 is a block diagram showing a preferred embodiment of an apparatus for converting a two-dimensional image sequence into a three-dimensional image according to the present invention.

FIG. 3 is a block diagram of an apparatus for converting a two-dimensional image sequence into a three-dimensional image according to the present invention. The apparatus includes an analog-to-digital converter (ADC) 300, an image block portion 310, a previous frame storing portion 320, a block motion measurer 330, a horizontal disparity generator 340, a composite image generator 350, a post processor 360, left/right image determiner 370, and first and second digital-to-analog converters (DAC) 382 and 384.

The horizontal disparity generator 340 includes a horizontal disparity converter 342, a horizontal disparity controller 344, and a motion characteristic determiner 346. The composite image generator 350 includes a block horizontal mover 352, a block composer 354, and an interpolator 356.

In the present invention, a three-dimensional image is generated using a two-dimensional image sequence captured by a "one-eyed" video camera by which it is possible to view a stereo-image through an image reproducing apparatus such as a TV, a VCR, a CD, an HDTV, and DVD without using two cameras, i.e., a stereoscopic-camera. The apparatus for converting the two-dimensional image sequence into a three-dimensional image according to the present invention generates a three-dimensional image formed of the original image and a new image by measuring a motion vector between two continuous images in the two-dimensional image sequence captured by the "one-eyed" video camera, generating a horizontal disparity from the motion vector, and generating a new image moved to a horizontal direction from the original image according to the horizontal disparity.

Referring to FIG. 3, the analog-to-digital converter 300 receives the two-dimensional image sequence photographed by the "one-eyed" video camera through an input terminal IN and converts an analog two-dimensional video signal into a digital signal. The image block portion 310 divides the current image converted into the digital signal into blocks having a predetermined size. Here, the predetermined size is n×n pixels. N is preferably 4 or 8. The image is divided into blocks in order to estimate the motion by distinguishing a main subject having a motion from a background having little motion therein. The previous frame storing portion 320 stores the previous image frame of the current image divided into blocks by the image block portion 310.

The block motion measurer 330 receives the current image divided into blocks by the image block portion 310 and a previous image frame from the previous frame storing portion 320. The block motion measurer 330 estimates the motion of the previous image frame from a concerned search region with respect to the respective blocks of the current image divided into blocks of a predetermined size. Namely, the amount and direction, i.e., the vector of the motion are measured using the corresponding blocks of the previous image frame.

In order to measure the motion between two continuous images, a block matching method is used for convenience of realization in the present invention. According to this method, the block motion measurer 330 extracts a second block having the same center position as the input current block, and larger than the current block and a search region in the previous frame, detects a block similar to the second block in the search region, and measures a difference between the center position of a similar block and that of the current block as the motion with respect to the current block. Here, the second block is at least large enough to surround the current block. The search region must be at least twice as large as the current block. The block matching method can be easily realized and provides motion vectors with respect to all pixels compared to other methods even though the measured motion may not be the same as the real motion of the subject in the image since the limit of the searching region and the similarity of the pixel values in the block are used.

A motion normalizer (not shown) may exist between the block motion measurer 330 and the horizontal disparity generator 340. The motion normalizer inputs the current image, the motions of whose blocks are measured by the block motion measurer 330, and normalizes the motions measured in the respective blocks so as to have correlation with the motions of other peripheral blocks.

In the block matching method, since the similarity of pixels between two blocks is compared, limiting the search region, the comparison result may be different from the real motion of the subject in the image. In order to compensate for the difference, filtering is necessary. The motion normalizer filters the magnitudes of the motions of the respective blocks by replacing the weighted mean value of the magnitudes of the motion of the current block measured by the block motion measurer 330 and the motions of the blocks adjacent to the current block by the magnitude of the motion of the current block. Here, it is preferable that the weighted value is set proportional to the similarity with respect to the magnitude of the motion between each adjacent block and the current block and a distance from the current block to each adjacent block. Also, considering that the respective blocks move in the horizontal direction in a composite image generator 350 to be described later, it is more preferable that a larger weighted value is set with respect to the block adjacent in the vertical direction to the current block than the block adjacent in the horizontal direction.

Referring to FIG. 3, the horizontal disparity generator 340 inputs the current image, the motion vectors of whose blocks are measured from the block motion measurer 330, and obtains the horizontal disparity from the motion vectors of the respective blocks according to the motion characteristic of the current image.

To be specific, the horizontal disparity converter 342 converts the motion vectors of the respective blocks measured by the block motion measurer 330 into disparities. In the present invention, a simple converting method in which the magnitude of the motion vector is calculated and the calculated value is considered as the disparity is used. Here, the disparity corresponds to the horizontal disparity generated by two images when the composite image to be generated later and the current image are displayed as the three-dimensional image.

The horizontal disparity controller 344 controls the horizontal disparity of the respective blocks converted by the horizontal disparity converter 342 in response to a predetermined control signal. This is for generating the three-dimensional image which can be perceived by the human disparity by controlling the horizontal disparity according to the presence of the motion of the camera which captures the current image and the presence of the motion of the main subject in the current image.

To be specific, the horizontal disparity controller 344 subtracts the horizontal disparity from the maximum horizontal disparity in response to a predetermined control signal and outputs the subtraction result as the horizontal disparity of the respective blocks or outputs the horizontal disparity output from the horizontal disparity converter 342 as it is. Here, the maximum horizontal disparity is determined by the block motion measurer 330. Also, the horizontal disparity controller 344 is scaled so that the horizontal disparity of the respective blocks does not exceed the predetermined maximum disparity before controlling the horizontal disparity.

The motion characteristic determiner 346 determines the motion characteristic of the current image from the motion vector of the respective blocks measured by the block motion measurer 330 and generates the control signal according to the determination result. To be specific, the motion characteristic determiner 346 analyses the motion vectors of the respective blocks, compares the magnitude of the motion of the current image with a predetermined reference value, and generates the control signal when the entire motion is larger than the reference value.

Here, the predetermined reference value denotes the magnitude of the entire motion when the camera which captures the current image moves and the main subject in the current image moves. Since that the camera moves means that the background in the image moves, there is little entire motion when the background and the main subject in the image move together. Therefore, the horizontal disparity controller 344 outputs the horizontal disparity output from the horizontal disparity converter 342 as it is and the value subtracted from the maximum horizontal disparity in other cases.

The image generator 350 inputs the current image having the horizontal disparity of the respective blocks from the horizontal disparity generator 340 and generates a composite image corresponding to the current image by moving the respective blocks in a horizontal direction according to each horizontal disparity.

To be specific, the block horizontal mover 352 moves the positions of all the blocks in the current image to a right horizontal direction by the horizontal disparity of the respective blocks. The block composer 354 composes the respective blocks moved from the block horizontal mover 352 and generates a composite image. The composite image interpolator 356 interpolates the region not filled by the respective blocks of the current image in the composite image generated by the block composer 354.

The post-processor 360 performs a predetermined post-process together with the composite image interpolator 356 in order to improve the quality of the new image. During the estimation of the motion according to the above-mentioned block matching method and the generation of a new image, blocks may be shown in the generated new image or picture quality may be deteriorated in an edge region. In order to compensate for this, a predetermined post-processing, for example, filtering using a median filter is performed. The post-processor according to a preferred embodiment provided by the present invention will be described in detail hereinafter.

The left/right image determiner 370 corresponding to the output portion inputs the composite image through the post-processor 360, inputs the current image from the analog-to-digital converter 300, and displays the three-dimensional image formed of the current image and the composite image. At this time, the left/right image determiner 370 outputs either the current image or the composite image as the left video signal and the other as the right video signal. The signals are converted into analog video signals through the first and second digital-to-analog converters 382 and 384 respectively and displayed through output terminals OUT1 and OUT2. The left video signal is displayed on the left eye and the right video signal is displayed on the right eye.

The left/right image determiner 370 displays the current image on the left eye and the composite image on the right eye based on positive disparity in a binocular disparity. Such a display method is not limited. It can vary according to the horizontal motion method during the generation of the composite image and whether the direction to which the sense of depth is to be given is positive or negative.

For example, when the positions of all the blocks in the current image are moved to the left horizontal direction by the horizontal disparity of each block by the block horizontal mover 352, the current image and the composite image are displayed based on the negative disparity. However, since the human eyes become tired if much negative disparity is given in order to improve the cubic effect, it is difficult to display the image of the negative disparity during a long time. Therefore, in the present invention, it is based that the image is displayed by the positive disparity.

As mentioned above, the present invention belongs to a stereo-technology using the binocular disparity. Here, the principle of the binocular disparity will be simply described in order to facilitate understanding of the present invention.

FIGS. 5A and 5B show the principle of binocular disparity. FIGS. 5A and 5B respectively show the positive disparity and the negative disparity. In FIGS. 5A and 5B, when the two images, i.e., the original image and the new image are displayed on the screen, the respective images are shown on the right and left eyes respectively. The corresponding points a and a' of the two images on the screen correspond the positions b and b' of the two eyes. However, a person senses that the corresponding point of the two images is positioned in the point P. Namely, the position sensed where a subject really exists is P in FIGS. 5A and 5B. The position of P can be easily obtained by a proportional expression, since two triangles Δ Paa' and Δ Pbb' are similar figures.

Therefore, when the three-dimensional image formed of the two images having the disparity, i.e., the original image and the new image are displayed on the screen, a person can perceive sense of depth. In the case of the positive disparity of FIG. 5A, a person perceives that the point P is behind the screen. In the case of the negative disparity of FIG. 5B, a person perceives that the point P is in front of the screen.

The new image generated in the present invention is obtained by moving the original image to the horizontal direction by the horizontal disparity. Therefore, though the motion of the subject in the original image has a vertical component, a natural stereo-image is generated.

Figure 4:
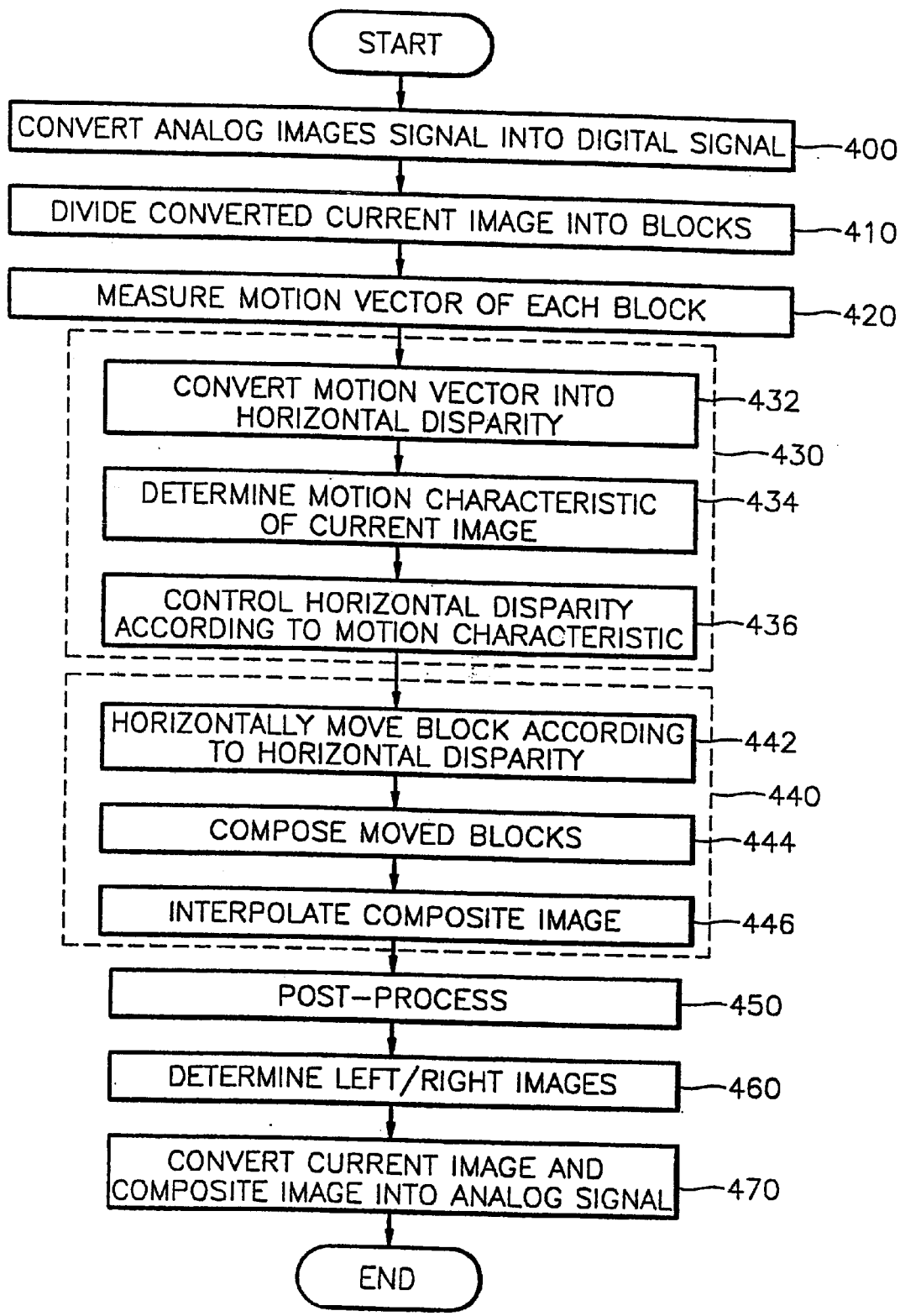
FIG. 4 is a flowchart according to a preferred embodiment of a method for converting a two-dimensional image sequence into a three-dimensional image according to the present invention.

FIG. 4 is a flowchart for describing a method for converting the two-dimensional image sequence into a three-dimensional image according to the present invention. Referring to FIG. 4, the three-dimensional image converting method according to the present invention, performed by the apparatus shown in FIG. 3 is described.

First, the analog two-dimensional image sequence signal is converted into a digital signal through the analog-to-digital converter 300 (step 400). Then, the current image converted into the digital signal is divided into blocks having a predetermined size through the image block portion 310 (step 410). Here, the predetermined size is n×n pixels. n is preferably 4 or 8.

After the step 410, the amount and direction of the motion of each block of the current image, i.e., the motion vector are measured through the block motion measurer 330 using the previous image frame stored in the previous image frame storing portion 320 (step 420). An optical flow measuring method or a block matching method used in the motion picture coding experts group (MPEG) I and II is used in order to measure the motion vector between the two sequent images. Also, a parallel hierarchical one-dimensional search (PHODS) method in which the amount of calculation is small can be used for fast processing.

In the step 420, the block matching method is used as a preferred embodiment in order to estimate the motion between the two sequent images. According to the method, a second block having the same center position as the current block, the motion of which is to be estimated and larger than the current block, is extracted from the current image. Then, the search region is extracted from the previous frame. A block similar to the second block is detected from the search region. A difference between the center position of the similar block and that of the current block is calculated. Here, the calculated difference is measured by the motion with respect to the current block. The second block is at least large enough to surround the current block. The search region must be at least two times as large as the block.

Figure 6:
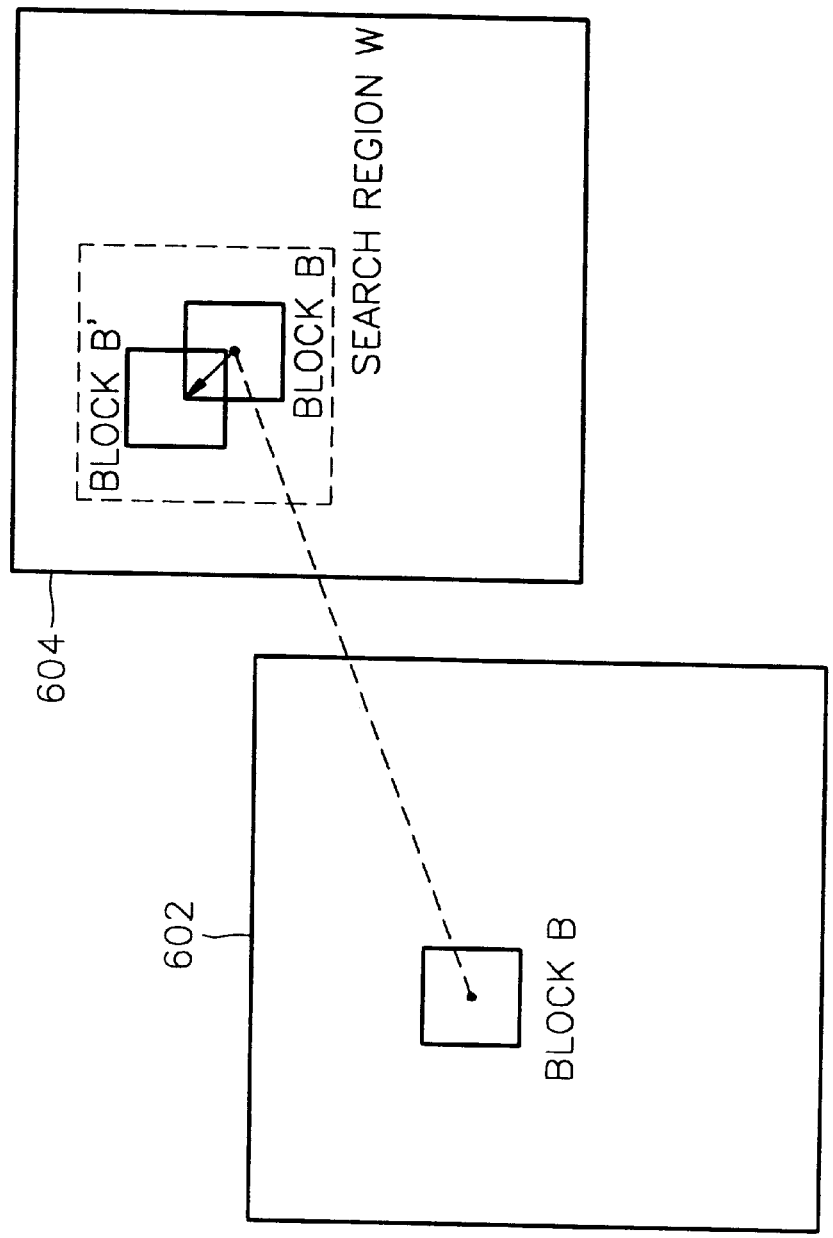
FIG. 6 describes the block matching method used for measuring the motion in each block.

FIG. 6 describes the block matching method used for measuring the motion in each block.

Referring to FIG. 6, the block matching method used in the present invention will be described in detail.

First, the size of each block is n1×n2 (n1>0 and n2>0) in a kth image of the two-dimensional image sequence, for example, N1×2N2 image. A larger block surrounding the block is called a macro block. The size of the macro block is for example 2n1×22n2. In the present invention, the block matching method is used as follows.

1. A block B with (a,b)=(n1/2,n2/2) as the center is obtained from a kth image 602.

2. A macro block M (not shown) having the same center position as the block B and larger than the block B is extracted from the kth image 602.

3. A search region W with (a,b) as the center is extracted from a (k−1)th image 604. Here, the size of the search region is w1×2w2 (w1>2n1 and w2>2n2).

4. A macro block M' (not shown) with (n1/2,n2/2) as the center is extracted from the search region W.

5. A minimum mean absolute difference (MAD) between the blocks M and M' is obtained. Here, the MAD represents a difference between the mean pixel value of the block M and that of the block M'.

6. If the MAD is smaller than a previous MAD, the MAD is determined to be a new MAD. In the search region, the center position of the macro block M' is stored as (r,c). If, the center of the macro block M' is (n1/2,n2/2), the MAD is determined to be an initial MAD.

7. In the search region W, the macro block M' is moved in the horizontal direction by a previously determined offset (offset>0) along a row.

8. The process proceeds to step 9 when the moved macro block M' is out of the search region W and returns to the step 5 if not.

9. The macro block M' is moved to a new position (a,b)=(a+offset,n2/2) in the search region W. The process proceeds to step 10 if the macro block M' is out of the search region W and returns to the step 5 if not.

10. The motion of the block B (u,v)=(a−r,b−c) is obtained from (r,c) finally stored in the step 6 and the process proceeds to step 11.

11. The center of the block B is set to (a,b)=(a,b+n1) by moving the block B by the size of the block in a horizontal direction. The process proceeds to step 12 if the block B is out of the region of the kth image and returns to the step 2 if not.

12. The center of the block B is set to (a,b)=(a+n1,b) by moving the block B by the size of the block in the vertical direction. The process is terminated since the block matching is performed with respect to all the blocks if the block B is out of the region of the kth image and returns to the step 2 if not.

In the above-mentioned processes, the macro block corresponding to the second block is used instead of the block of the original image in real block matching. The motion obtained from this is determined to be the motion of the block of the original image. This is because the following shortcomings are caused when the blocks of the original image are used as they are. First, as small as the blocks are, a result different from the real motion of the subject in the image may be brought. Second, there is a high probability that there is a correlation of the motion between adjacent blocks. However, the result of the block matching is not like that.

Therefore, in order to solve the problems, the macro block which is the second block is used in measuring the motion by the block matching method in the present invention. Accordingly, the following advantages may result. First, since there is a high probability of having a specific point in the block when the block comparing the current image with the previous image becomes larger, the motion obtained from the macro block is relatively similar to the real motion of the subject in the image. Second, since overlapping portions are generated between the macro blocks, the adjacent blocks guarantee a high correlation between the respectively measured motions. Accordingly, it is possible to prevent the image from breaking when the new image is generated.

After the step 420, a step of normalizing the motions measured in the respective blocks of the current image to have a correlation with the motions of the peripheral blocks may be performed (not shown).

The motions of the respective blocks estimated in the step 420 can be different from the motions of the peripheral blocks. When it is ignored, the quality of the image may be deteriorated when the new image is generated. In order to prevent this, the motions of the estimated respective blocks are normalized when the motions of the respective blocks are much different from the motions of the peripheral blocks. Such a normalization is based on the following assumptions. First, a correlation between the motion of the block in an arbitrary pixel position (a,b) and the motions of the adjacent blocks is larger as the distance between blocks becomes closer. Second, as the motion is more similar to the motion of the current block, the motion has more correlation.

In order to normalize the motions of the respective blocks under the assumption, first, a weighted value is set proportional to the similarity to the current block with respect to the magnitude of the motion and the distance from the current block, with respect to each block adjacent to the current block to be normalized. Then, the weighted mean value of the current block and the adjacent blocks is replaced by the magnitude of the motion of the current block.

The magnitude of the motion of the current block is calculated by Equation 1 by the above method.

$$t = \sum_{i=0}^{i=nn-s} t_i e^{-(t-t_i)^2} e^{-((a-a_i)^2+(b-b_i)^2)} / \quad \text{[EQUATION 1]}$$

$$\sum_{i=0}^{i=nn-s} e^{-(t-t_i)^2} e^{-((a-a_i)^2+(b-b_i)^2)}$$

The magnitude of the motion of the current block is simply calculated by Equation 2.

$$t = \sum_{i=0}^{i=nn-s} \frac{t_i}{(t-t_i)^2} ((a-a_i)^2 + (b-b_i)^2) / \quad \text{[EQUATION 2]}$$

$$\sum_{i=0}^{i=nn-s} \frac{1}{(t-t_i)^2} ((a-a_i)^2 + (b-b_i)^2)$$

In Equations 1 and 2, when the set of the magnitudes of the motions of the blocks excluding predetermined s blocks from the n×n (n>0) adjacent blocks aligned in the order of the magnitude of the motion is represented to be $\{t_1, t_2, \ldots, t_{n\ n-s}\}$, $t$, $t_i$, and $(a_i, b_i)$ respectively represent the magnitude of the motion of the current block, the magnitude of an arbitrary block which belongs to the set, and the position of the block having $t_i$ in the image.

However, the above method for normalizing the motions of the respective blocks is not applied as it is. Much more weighted value is given to the blocks adjacent in the vertical direction. Namely, in another method for normalizing the motions of the respective blocks, the weighted value is set with respect to the respective blocks adjacent to the current block to be normalized proportional to the similarity to the current block with respect to the magnitude of the motion and the distance from the current block.

Then, a larger weighted value is set to the block adjacent to the current block in the vertical direction than to the block adjacent to the current block in the horizontal direction. Then, the weighted mean value of the current block and the adjacent blocks is replaced by the magnitude of the motion of the current block.

The reason why more weighted value is given to the vertical direction is that it is expected that the respective blocks are moved to the horizontal direction with respect to the new image in subsequent steps. Namely, when the magnitudes of the motions of the respective blocks are different from those of the upper and lower adjacent blocks when the respective blocks are moved to the horizontal direction, the picture quality of the new image may be considerably deteriorated. In particular, the image is very poor near the vertical edges of the respective blocks. Therefore, it is necessary to give more weighted value to the vertically adjacent blocks.

FIGS. 7A and 7B show examples of applying the weighted value to the adjacent blocks in the process of normalizing the estimated motion. FIG. 7A shows an example of applying the weighted value to the adjacent blocks proportional to the distance from the current block. FIG. 7B shows an example of applying more weighted value to the vertically adjacent blocks.

Referring to FIG. 4, when the motion vector with respect to the respective blocks of the current image is measured in the step 420, horizontal disparity is obtained from the motion vector of each block according to the characteristic of the motion of the current image through the horizontal disparity generator 340 (step 430).

The step 430 includes the following steps. First, the motion vector of each block measured in the step 420 is converted into the horizontal disparity through the horizontal disparity converter 342 (step 432). The magnitude of the motion vector is calculated and the calculated value is considered to be the horizontal disparity in order to obtain the horizontal disparity. Here, the horizontal disparity corresponds to the disparity generated by two images when the composite image to be generated later and the current image are displayed as the three-dimensional image. The horizontal disparity px is obtained by Equation 3.

$$px = \sqrt{Vx^2 + Vy^2} \qquad \text{[EQUATION 3]}$$

As shown in Equation 3, the horizontal disparity (px) is the magnitude of the motion vector ($V_x$, $V_y$).

Then, the motion characteristic of the current image is determined by the motion characteristic determiner 346 (step 434). The magnitude of the entire motion of the current image is compared with a predetermined reference value by analyzing the motion vector of each block and the comparison result is considered to be the motion characteristic of the current image. Here, the predetermined reference value represents the magnitude of the entire motion when the camera which captures the current image moves and the main subject in the current image moves.

Then, the horizontal disparity obtained in the step 432 is controlled according to the motion characteristic of the current image through the horizontal disparity controller 344 (step 436). The horizontal disparity is controlled to generate the three-dimensional image which can be perceived by human disparity by controlling the disparity according to whether the camera which captures the current image and the main subject in the current image move or not.

When the entire motion of the current image is no more than a predetermined reference value, the original horizontal disparity obtained in the step 432 is maintained. When the entire motion of the current image is larger than the predetermined reference value, the horizontal disparity obtained in the step 432 is subtracted from the maximum horizontal disparity and the subtraction result is replaced by the horizontal disparity of each block.

Here, the maximum horizontal disparity is determined in the step 420. Before controlling the horizontal disparity in the step 436, the horizontal disparity of each block is scaled so as not to exceed the predetermined maximum disparity. The horizontal disparity (px) is obtained by the Equation 4 in the latter case.

$$px = px_{max} - px \qquad \text{[EQUATION 4]}$$

In the Equation 2, $px_{max}$ represents the value determined by the block motion measurer 330.

Referring to FIG. 4, after the step 430, each block of the current image moves in the horizontal direction according to each horizontal disparity through the image generator 350. Accordingly, the composite image corresponding to the current image is generated (step 440).

The step 440 comprises the following steps. First, all the blocks in the current image move in a right horizontal direction by the horizontal disparity of each block through the block horizontal mover 352 (step 442). The pixel data of all the blocks horizontally moved in the step 442 are composed through the block composer 354, thus generating the composite image (step 444)

FIGS. 8A and 8B describe processes of horizontally moving the blocks in the method shown in FIG. 4. FIG. 8A describes the horizontal motion of the blocks when the horizontal disparity $px_1$ of first moved block $B_1$ is larger than the horizontal disparity $px_2$ of the next moved block $B_2$. FIG. 8B describes the horizontal motion of the block when the horizontal disparity $px_1$ of first moved block $B_1$ is smaller than the horizontal disparity $px_2$ of the next moved block $B_2$. ● represents the position of the pixel in the block. ($B_i$, $px_i$) represents the horizontal disparity $px_i$ of an ith block. Also, in order to simplify explanation, when each block is 8×8 pixels, only one scan line is taken as an example.

In FIG. 8A, when the horizontal parity $px_1$ is larger than the horizontal disparity $px_2$, for example, when the horizontal disparity $px_1$ is 3 and the horizontal disparity $px_2$ is 1, all the pixels of the block $B_1$ are horizontally moved by 3. In the case of the block $B_2$, pixels from the third pixel on are horizontally moved by 1. Namely, in the case of the block $B_2$, the first two pixels are not moved. In FIG. 8B, when the horizontal disparity $px_1$ is smaller than the horizontal disparity $px_2$, for example, when the horizontal disparity $px_1$ is 1 and the horizontal disparity $px_2$ is 3, all the pixels of the blocks $B_1$ and $B_2$ are horizontally moved by 1 and 3, respectively. However, as shown in FIG. 8B, since the horizontal disparities of the blocks $B_1$ and $B_2$ are different, the block $B_2$ is filled with two pixels unfilled after the block $B_1$ is filled. Accordingly, empty pixels are generated.

After the step 444, the regions not filled by the respective blocks in the composite image composed through the process of horizontally moving blocks are interpolated through the interpolator 356 (step 446). Namely, in the composite image, empty pixels may be generated as shown in FIG. 8B since the respective blocks of the current image are horizontally moved by different horizontal disparities. There are various methods for giving appropriate pixel values in the empty pixels such as a linear interpolation method, a bilinear interpolation method, and a weighted interpolation method. The simplest method is to fill the empty pixels with the values of the nearest left or right pixels. Referring to FIG. 8B, the value of the pixel $a_1$ or $a_2$ is used. In the present invention, this method having the smallest calculation amount is used.

After the step 440, a predetermined post-processing is performed through the post-processor 360 in order to improve the quality of the new image (step 450). When the motion is measured and the new image is generated according to the above-mentioned block matching method, blocks may be shown in the generated new image or the quality may be deteriorated in the edge area. In order to compensate for this, a predetermined post-process, for example, filtering using a median filter is performed. The operation of the post-processor according to a preferred embodiment provided by the present invention will be described below.

After the step 450, in order to display the three-dimensional image formed of the current image and the composite image, the left/right images are determined through the left/right image determiner 370 (step 460). Either the current image or the composite image is displayed on the left eye and the other is displayed on the right eye. Accordingly, a person can feel the cubic effect by the principle of binocular disparity. Finally, since these images are digital signals, they are converted into analog signals through the first and second digital-to-analog converters 382 and 384 and displayed (step 470). In order to appreciate the three-dimensional image displayed on the display means such as a monitor through the above processes, stereo scopic glasses synchronized with the three-dimensional image are necessary.

The depth of the image is related to the amount of motion. When the camera moves and the captured screen images do not move, the amount of motion is inversely proportional to the depth of the image. Also, a near subject has a large motion and a remote subject has a relatively smaller motion. When the camera is fixed and there is a moving subject in the image, the near subject moves quickly and the remote subject moves slowly. In the present invention, when the left/right images are determined in the step 460 applying the principle, the determination is performed differently according to the positive disparity and the negative disparity.

So far, the apparatus and method for converting the two-dimensional image sequence into the three-dimensional image according to the present invention have been explained. To be brief, in the two-dimensional/three-dimensional or one eyed-stereo image conversion, the motion vector of each block is obtained from the original image and the disparity is obtained using the motion vector. The disparity image is generated by horizontally moving the original image by the disparity. Accordingly, the stereo-image formed of the original image and the displacement image is generated.

However, the motion vector obtained in block units from the original image may be incorrect. Namely, a disparity map using the motion does not match well with the real boundary of the subjects in the original image because of the incorrectness of the motion itself. In particular, since the disparity reflects the size of the motion vector in the case of converting the motion vector to the disparity only in the horizontal direction, when different disparities are assigned to the blocks corresponding to the same subjects in the original image, the image is broken in the vertical direction.

Therefore, the post-process of the disparity image for preventing the boundary of the subjects in the image from being broken in the vertical direction during the generation of the stereo-image by controlling the disparity between adjacent blocks is necessary. As mentioned above, the post-processor 360 is positioned next to the composite image generator 350 in FIG. 3. The post-processing step 450 follows the composite image generating step 440 in FIG. 4. This will be described in detail.

In the post processing method according to the present invention, it is determined whether the adjacent blocks form the same subject using the brightness characteristic of each block in the original image. The disparity of each block of the original image is controlled using a filtering mask having a variable size obtained by the determination result. The disparity image is reconstructed according to the controlled disparity.

Also, the post-processing method of the present invention to be described hereinafter is preferably applied to the apparatus and method of converting a two-dimensional image sequence into a three-dimensional image according to the present invention. However, it can be applied to other three-dimensional image converting apparatuses for generating the disparity image.

FIG. 9 is a flowchart for describing the post-processing method according to the present invention. In order to post-process the disparity image made by extracting the motion of the original image, the disparity is obtained in block units from the original image using the original image, the disparity image, and a maximum disparity limit and the disparity map comprised of the disparities of all the blocks is generated (step 900).

The disparity image is generally made by the disparities of the respective blocks of the original image. However, since it is not possible to know how the disparity image is particularly made, the disparity of each block of the original image divided into blocks having a predetermined size is obtained using the disparity image and the maximum disparity limit (step 900). The maximum disparity limit is calculated using the size of the search region when the size of the block of the original image and the motion of the block of the original image are searched in a previous image. The disparity of each block is obtained by a minimum absolute mean difference (MAD) calculating method.

The post-processing is performed with respect to the disparity map generated in the step 900.

The brightness characteristics between adjacent blocks are compared with each other in the vertical direction in the respective blocks of the original image. A group of blocks having similar brightness characteristics is determined to be a filtering mask (step 920). The MAD between a predetermined number of adjacent blocks and the current block is obtained. When the MAD between the current block and the vertical lower block is the smallest, these blocks are considered to be the boundary or the inside of one subject. The current block is continuously compared with the adjacent blocks in the vertical direction until a condition in which the MAD is the smallest is not met. When there are no blocks having similar brightness characteristics, the group of the blocks until then is determined to be one filtering mask.

After the step 920, the disparity map is modified by replacing the disparity of each block of the original image by a new disparity using a corresponding filtering mask (step 940). To be specific, after aligning the blocks in the filtering mask of each block determined in the step 920 in the order of the size of the disparity, a median disparity is used as a new disparity among the aligned blocks.

Finally, the disparity image is reconstructed using the original image and the modified disparity map (step 960). When the disparity map is modified in the step 920, the post-processed disparity image is generated by reconstructing the disparity image by horizontally mapping the original image according to the modified disparity map.

Figure 10A:
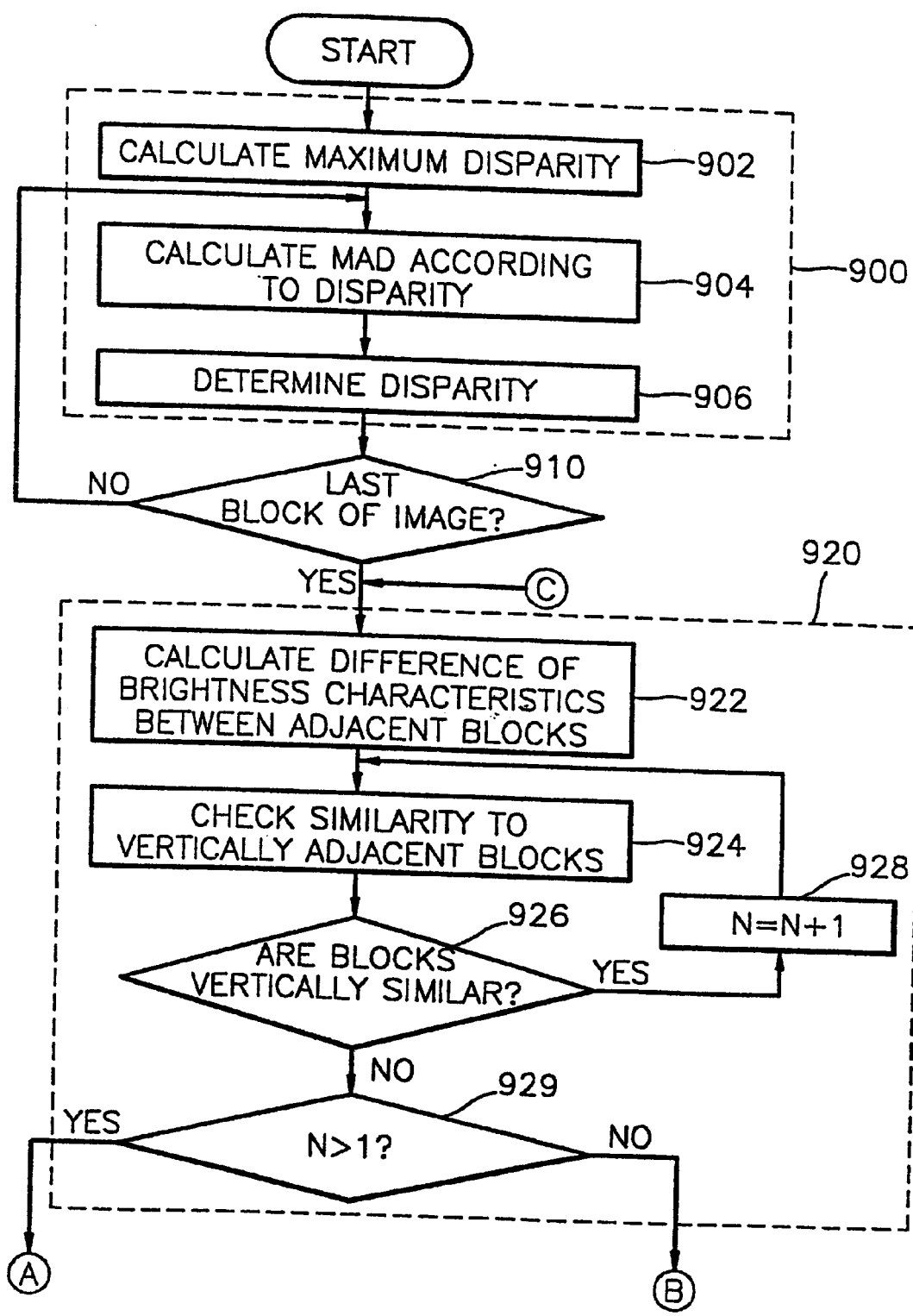
FIGS. 10A and 10B are flowcharts describing particularly the post-processing method according to the present invention shown in FIG. 9.
Figure 10B:
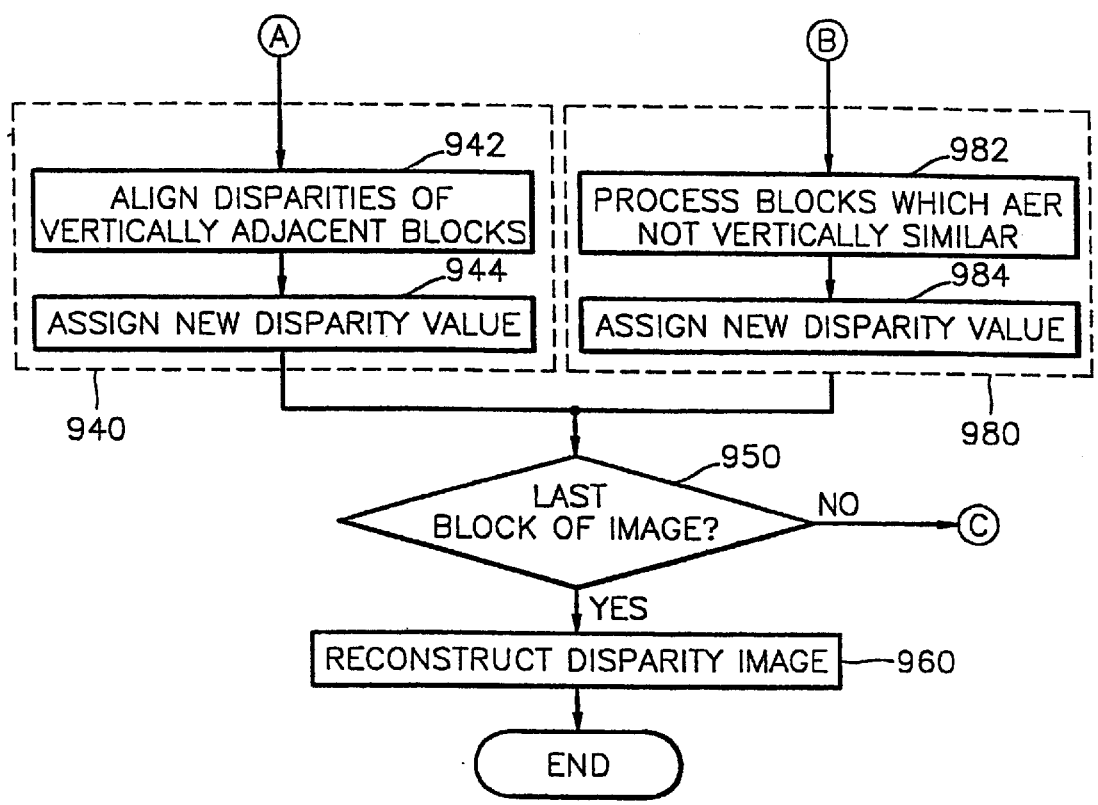

FIGS. 10A and 10B are a flowchart for describing the post-processing method according to the present invention of FIG. 9 in detail. Referring to FIG. 10, the respective steps shown in FIG. 9 will be described in detail.

The step 900 is comprised of the following steps.

First, the maximum disparity is calculated (step 902). The motion vector of each block of the original image is measured by the block measuring method. In the case of calculating the disparity to be used for generating the stereo-image from the motion vector, if the size of the block of the original image and the size of the search region when the motion of the block of the original image is searched in the previous image are known, the maximum disparity can be calculated. The maximum disparity (MD) is represented by Equation 5.

$$MD = \sqrt{\left(\frac{W-B}{2}\right)^2 + \left(\frac{W-B}{2}\right)^2} \qquad \text{[EQUATION 5]}$$

wherein, B and W respectively represent the size of the block and the size of the search region.

After the step 902, the MAD according to the disparity is calculated with respect to the current block of the input original image (step 904). The MAD between the original image and the disparity image is calculated in order to calculate the disparity in block units of the original image using the original image and the displacement image obtained by the block estimation method. The MAD is calculated by Equation 6.

$$MAD(d_1) = \sum_{x,y \in B} |I_{original}(x, y) - I_{displaced}(x - d_1, y)| \quad \text{[EQUATION 6]}$$

wherein, B and $d_1$ respectively represent the region in the block and the disparity. At this time, the disparity $d_1$ cannot exceed the MD. In the step 904, the MAD is calculated by substituting the disparity $d_1$ between 0 and the MD for Equation 6.

After the step 904, the disparity is determined with respect to the current block (step 906). Namely, the disparity $d_1$ which makes the MAD calculated in the step 104 have a minimum MAD is determined to be the disparity of the current block.

After the step 906, it is determined whether after the steps 904 and 906 the current block is the last block of the image (step 910). If not, the process returns to the step 904 and the disparity of the next block of the original image is obtained. When it is considered that the disparities of all the blocks of the original image are obtained in the step 910, the disparity map of the original image comprised of the disparities is generated.

Then, the step 920 is comprised of the following steps.

First, a difference in the brightness characteristics between adjacent blocks is calculated (step 922). The brightness characteristic difference corresponds to the MAD between the adjacent blocks. In the original image, the current block is represented by $B_{i,j}$. Here, i and j respectively represent an ith row and a jth column. In an initial stage, i and j are respectively 0 and seven adjacent blocks excluding $B_{i,j}$ are selected as the blocks adjacent to the current block $B_{i,j}$ The brightness characteristics between the current block $B_{i,j}$ and selected adjacent blocks are compared using Equation 7.

$$\text{NEXT\_DIFF}(B_{i,j}) = \sum_{x_1,y_1 \in B_{i,j}, x_2,y_2 \in B_{i+1,j}} |I_{original}(x_1, y_1) - I_{original}(x_2, y_2)| \quad \text{[EQUATION 7]}$$

$$\text{LEFT\_DIFF}(B_{i,j}) = \sum_{x_1,y_1 \in B_{i,j}, x_2,y_2 \in B_{i,j-1}} |I_{original}(x_1, y_1) - I_{original}(x_2, y_2)|$$

$$\text{RIGHT\_DIFF}(B_{i,j}) = \sum_{x_1,y_1 \in B_{i,j}, x_2,y_2 \in B_{i,j+1}} |I_{original}(x_1, y_1) - I_{original}(x_2, y_2)|$$

$$\text{UPPER\_LEFT\_DIFF}(B_{i,j}) = \sum_{x_1,y_1 \in B_{i,j}, x_2,y_2 \in B_{i-1,j-1}} |I_{original}(x_1, y_1) - I_{original}(x_2, y_2)|$$

$$\text{LOWER\_RIGHT\_DIFF}(B_{i,j}) = \sum_{x_1,y_1 \in B_{i,j}, x_2,y_2 \in B_{i+1,j+1}} |I_{original}(x_1, y_1) - I_{original}(x_2, y_2)|$$

$$\text{UPPER\_RIGHT\_DIFF}(B_{i,j}) = \sum_{x_1,y_1 \in B_{i,j}, x_2,y_2 \in B_{i-1,j+1}} |I_{original}(x_1, y_1) - I_{original}(x_2, y_2)|$$

$$\text{LOWER\_LEFT\_DIFF}(B_{i,j}) = \sum_{x_1,y_1 \in B_{i,j}, x_2,y_2 \in B_{i+1,j-1}} |I_{original}(x_1, y_1) - I_{original}(x_2, y_2)|$$

After the step 922, the similarity between the current block $B_{i,j}$ and the vertically adjacent blocks is checked (step 924). As a result, it is determined whether the blocks are vertically similar (step 926).

In the MAD between the current block $B_{i,j}$ and the seven adjacent blocks, calculated in the step 922, the NEXT_DIFF $(B_{i,j})$ which is the MAD between the current block and the vertical lower block $B_{i+1,j}$ is the smallest, this means the two blocks positioned in the vertically direction have the most similar brightness characteristics compared with other blocks. Also, this means these two blocks have a high possibility to form the same subject or the same background in the image.

When it is determined that the current block $B_{i,j}$ is similar to the vertical lower block $B_{i+1,j}$ in the step 926, the respective positions and disparities of the current block $B_{i+1,j}$ and the vertical lower block $B_{i+1,j}$ are stored and the number N of the stored disparities is counted (step 928). Here, the disparities are obtained with reference to the disparity map generated in the step 900.

After the step 928, in order to check whether the current block has a brightness characteristic similar to the vertically adjacent blocks, the position of the current block $B_{i,j}$ is changed into the position of the vertical lower block $B_{i+1,j}$ and the process returns to the step 924. The steps 924 through 928 are repeated until there are no blocks having a brightness characteristic similar to the current block $B_{i,j}$ for example, to the last row of the image.

When it is determined that the current block $B_{i,j}$ has no similarity to the vertical lower block $B_{i+1,j}$ in the step 926, it is determined whether the number N of the disparities counted in the step 928 is at least larger than 1 (step 929). When the current block $B_{i,j}$ is at least similar to the vertical lower block $B_{i+1,j}$ it is possible to obtain the filtering mask. The filtering mask corresponds to the group of blocks having similar brightness characteristics stored after the step 926.

Then, the step 940 is comprised of the following steps.

First, the blocks in the filtering mask with respect to the current block $B_{i,j}$ are aligned in the order of the magnitudes of disparities (step 942). Namely, when the number N of the disparities counted in the step 929 is larger than 1, the blocks in the filtering mask are aligned in the order of the magnitudes of disparities.

After the step 942, the median disparity is extracted among the aligned blocks and the disparities of all blocks in the filtering mask including the current block are replaced by the median disparity (step 944). At this time, the disparity map is also modified.

The disparity map is modified only when the number N of the disparities is at least larger than 1. Namely, when the NEXT_DIFF $(B_{i,j})$ which is the MAD between the current block $B_{i,j}$ and the vertical lower block $B_{i+1,j}$ is not the smallest among the MADs between the current block $B_{i,j}$ and the seven adjacent blocks in the step 926 the number N of the counted disparities becomes 0 and the step 940 is not performed.

When the number N of the disparities is 0 in the step 929, an additional step 980 is performed.

To be specific, at least two adjacent blocks having similarity are extracted using the difference of the brightness characteristics between the current block $B_{i,j}$ and the adjacent block calculated in the step 922, and the median disparity is selected among the disparities between the extracted blocks and the current block $B_{i,j}$ (step 982).

For example, Equation 8 is defined in order to consider the brightness characteristic in a diagonal direction with respect to the current block $B_{i,j}$.

$$\text{ULLR }(B_{i,j}) = \text{UPPER\_LEFT\_DIFF }(B_{i,j}) + \text{LOWER\_RIGHT\_DIFF}(B_{i,j})$$

$$\text{URLL}(B_{i,j}) = \text{UPPER\_RIGHT\_DIFF}(B_{i,j}) + \text{LOWER\_LEFT\_DIFF}(B_{i,j})$$

$$\text{HORIZON}(B_{i,j}) = \text{LEFT\_DIFF}(B_{i,j}) + \text{RIGHT\_DIFF}(B_{i,j}) \quad \text{[EQUATION 8]}$$

wherein $\text{ULLR}(B_{i,j})$, $\text{URLL}(B_{i,j})$, and $\text{HORIZON}(B_{i,j})$ represent the sum of the MADs of the two blocks in the diagonal direction with respect to the current block $(B_{i,j})$.

The smallest value is selected among $\text{ULLR}(B_{i,j})$, $\text{URLL}(B_{i,j})$, and $\text{HORIZON}(B_{i,j})$. If $\text{ULLR}(B_{i,j})$ has the smallest value, the median value is selected among the disparities of $B_{i-1,j-1}$ and $B_{i,j}$ including the current block $(B_{i,j})$ and is replaced by the disparity of the current block $(B_{i,j})$. Also, the disparity map is modified. If $\text{URLL}(B_{i,j})$ has the smallest value, the median value is selected among the disparities of $B_{i-1,j+1}$ and $B_{i+1,j-1}$ including the current block $(B_{i,j})$ and is replaced by the disparity of the current block $(B_{i,j})$. Also, the disparity map is modified. If $\text{HORIZON}(B_{i,j})$ has the smallest value, the median value is selected among the disparities of $B_{i,j-1}$ and $B_{i,j-1}$ including the current block $(B_{i,j})$ and is replaced by the disparity of the current block $(B_{i,j})$. Also, the disparity map is modified.

Finally, it is determined whether after the step 940 or 980 the current block is the final block of the image (step 950). If not, the process returns to the step 920 and the disparity map is modified. When the disparity map is modified because the disparities of all the blocks of the original image are assigned to new disparities, the disparity image is reconstructed using the original image and the modified disparity map (step 960).

Figure 11A:
FIGS. 11A through 11C show a comparison example of a displacement image with the post-processed displacement image obtained by the present invention.
Figure 11B:
Figure 11C:
Figure 12A:
FIGS. 12A through 12C show another comparison example of the displacement image with the post-processed displacement image obtained by the present invention.
Figure 12B:
Figure 12C:

FIGS. 11A through 11C show an example of comparing the disparity image with the post-processed disparity image obtained by the present invention. FIGS. 12A through 12C show another example of comparing the disparity image and the post-processed disparity image obtained by the present invention. In these drawings, A, B, and C respectively denote the original image, the disparity image, and the post-processed disparity image obtained by the present invention.

As shown in the drawings, in the disparity image which is not post-processed, the boundary of the subject is broken in the vertical direction (in particular, refer to the portion described by a straight line). However, since the boundary of the subject is not broken in the post-processed disparity image obtained by the present invention, the picture quality of the original image is maintained.

The above-mentioned post-processing method according to the present invention can be applied to the post-processing filter which performs the method. The post-processing filter has a mask of a variable size. The size of the mask is determined considering the brightness characteristics between adjacent blocks, which becomes an important characteristic in determining whether the blocks belong to the same subject.

As mentioned above, by the apparatus and method for converting the two-dimensional image sequence into the three-dimensional image, it is possible to generate the three-dimensional image in which each region has a sense of depth, which has a natural cubic effect even though the motion of the camera and the vertical and fast motion of the subject in the image are generated, and can be perceived by human disparity.

Also, in the apparatus and method for converting the two-dimensional image sequence into the three-dimensional image according to the present invention, the three-dimensional image is generated using the two-dimensional image captured by the "one-eyed" video camera without using the stereoscopic camera. Therefore, it is possible to view a stereo image through an image reproducing apparatus such as the TV, VCR, DVD, HDTV, and CD and to improve examination efficiency by making it possible to view the image three-dimensionally, applied to a medical field using an endoscope and supersonic waves. Other than these, it can be applied to various fields including the entertainment field of making animation three-dimensionally.

Also, by the post-processing method according to the present invention, it is possible to improve the quality of the displacement image by determining whether the adjacent blocks belong to the same subject using the brightness characteristic of each block in the original image and post-processing the displacement image as a result. Accordingly, it is possible to generate a natural stereo-image.

What is claimed is:

1. An apparatus for converting a two-dimensional image sequence into a three-dimensional image, comprising:

a block motion measuring portion for measuring a motion vector for each block of a current image divided into blocks having a predetermined size using a previous image frame;

a horizontal disparity generating portion for obtaining a horizontal disparity from the motion vector of each block according to the motion characteristic of the current image;

an image generating portion for moving each block in a horizontal direction according to each horizontal disparity and generating a composite image; and an outputting portion for displaying a three-dimensional image comprised of the current image and the composite image.

2. The apparatus of claim 1, wherein, when a block having the same center position as an input current block and which is larger than the current block is called a second block, the block motion measuring portion detects a block similar to the second block in a search region on the previous frame and measures a difference of the center positions between the similar block and the current block as the motion of the current block.

3. The apparatus of claim 2, wherein the search region is at least twice as large as the current block.

4. The apparatus of claim 1, wherein the horizontal disparity generating portion comprises:

a horizontal disparity converting portion for converting the motion vector of each block measured by the block motion measuring portion into a horizontal disparity;

a horizontal disparity controlling portion for controlling the horizontal disparity converted by the horizontal disparity converting portion in response to a predetermined control signal; and a motion characteristic determining portion for determining the motion characteristic of the current image from the motion vector of each block and generating the control signal according to the determination result.

5. The apparatus of claim 4, wherein the horizontal disparity converting portion calculates the magnitude of the motion vector and considers the calculated value as the horizontal disparity.

6. The apparatus of claim 4, wherein the horizontal disparity controlling portion outputs the horizontal disparity converted by the horizontal disparity converting portion as it is or subtracts the horizontal disparity from a maximum horizontal disparity in response to the control signal and outputs the subtraction result as the horizontal disparity of the respective blocks, wherein the maximum horizontal disparity is determined by the block motion measuring portion.

7. The apparatus of claim 4, wherein the motion characteristic determining portion analyses the motion vector of each block, compares the magnitude of the entire motion of the current image with a predetermined reference value, and generates the control signal when the entire motion is larger than the reference value, wherein the predetermined reference value represents the magnitude of the entire motion when a camera which captures the current image moves and a main subject in the current image moves.

8. The apparatus of claim 1, wherein the image generating portion comprises:

a block horizontal moving portion for moving the positions of all the blocks in the current image in a right horizontal direction by a horizontal disparity of each block; and a block composing portion for composing all the blocks moved by the block horizontal moving portion and generating the composite image.

9. The apparatus of claim 8, wherein the image generating portion further comprises a block interpolating portion for interpolating regions not filled by all the blocks in the composite image generated by the block composing portion.

10. The apparatus of claim 1, wherein the outputting portion comprises a left/right image determining portion for outputting either the current image or the composite image as a left image signal and the other as a right image signal, wherein the left image signal is displayed on the left eye and the right image signal is displayed on the right eye.

11. The apparatus of claim 1, further comprising:

an image block portion for dividing the current image into blocks having the predetermined size and outputting the blocks to the block motion measuring portion; and a previous frame storing portion for storing the previous image frame and outputting the previous image frame to the block motion measuring portion.

12. The apparatus of claim 1, further comprising a motion normalizing portion for normalizing the motion measured in each block by the block motion measuring portion to have a correlation with the motions of peripheral blocks.

13. The apparatus of claim 12, wherein the motion normalizing portion replaces a weighted mean value between the magnitude of the motion of the current block measured by the block motion measuring portion and the magnitudes of the motions of the blocks adjacent to the current block by the magnitude of the motion of the current block.

14. The apparatus of claim 13, wherein a weighted value with respect to each adjacent block is set proportional to the similarity to the current block with respect to the magnitude of the motion and a distance from the current block.

15. The apparatus of claim 13, wherein a weighted value with respect to each adjacent block is set proportional to the similarity to the current block with respect to the magnitude of the motion and a distance from the current block and wherein the weighted value with respect to blocks vertically adjacent to the current block is set to be larger than blocks horizontally adjacent to the current block.

16. A method for converting a two-dimensional image sequence into a three-dimensional image, comprising the steps of:

(a) dividing an input current image into blocks having a predetermined size;

(b) measuring a motion vector for each block of the current image using a previous image frame;

(c) obtaining a horizontal disparity from the motion vector of each block according to the motion characteristic of the current image;

(d) generating a composite image by moving each block in a horizontal direction according to the each horizontal disparity; and (e) displaying a three-dimensional image formed of the current image and the composite image.

17. The method of claim 16, wherein the step (b) comprises the steps of:

(b1) extracting a second block having the same center position as a current block the block motion of which is to be estimated and larger than the current block from the current image;

(b2) extracting a search region from the previous frame;

(b3) detecting a block similar to the second block in the search region; and (b4) calculating a difference of center positions between the similar block and the current block, wherein the difference is estimated to be the motion of the current block.

18. The method of claim 17, wherein the search region is at least twice as large as the current block.

19. The method of claim 16, wherein the step (c) comprises the steps of:

(c1) converting the motion vector of each block into a horizontal disparity;

(c2) determining the motion characteristic of the current image; and (c3) controlling the horizontal disparity according to the motion characteristic.

20. The method of claim 19, wherein, in the step (c1), the magnitude of the motion vector is calculated and the calculated value is obtained as the horizontal disparity.

21. The method of claim 19, wherein, in the step (c2), the motion vector of each block is analyzed, the magnitude of the entire motion of the current image is compared with a predetermined reference value, and the comparison result is considered as the motion characteristic, wherein the predetermined reference value represents the magnitude of the entire motion when a camera which captures the current image moves and a main subject in the current image moves.

22. The method of claim 21, wherein the step (c3) comprises the steps of:

outputting the horizontal disparity obtained in the step (c1) as it is when the entire motion of the current image is no more than a predetermined reference value; and subtracting the horizontal disparity from a maximum horizontal disparity when the entire motion of the current image is larger than the predetermined reference value and outputting the subtraction result as the horizontal disparity of each block, wherein the maximum horizontal disparity is determined in the step (b).

23. The method of claim 16, wherein the step (d) comprises the steps of:
   (d1) moving the positions of all the blocks in the current image in a right horizontal direction by the horizontal disparity of each block; and
   (d2) composing all the moved blocks and generating the composite image.

24. The method of claim 23, wherein the step (d) further comprises the step of interpolating regions not filled by all the blocks in the composite image.

25. The method of claim 16, wherein, in the step (e), either the current image or the composite image is displayed on the left eye and the other is displayed on the right eye.

26. The method of claim 17, wherein after the step (b) further comprises the steps of:
   (b5) setting a weighted value with respect to each block adjacent to a current block to be normalized proportional to a similarity to the current block with respect to the magnitude of the motion and a distance from the current block;
   (b6) obtaining a weighted mean value between the current block and the adjacent blocks; and
   (b7) replacing the weighted mean value by the motion vector of the current block.

27. The method of claim 26, wherein, in the steps (b5) through (b7), the motion of the current block is normalized using the equation, $$t = \sum_{i=0}^{i=nn-s} t_i e^{-(t-t_i)^2} e^{-\left((a-a_i)^2 + (b-b_i)^2\right)} \Bigg/ \sum_{i=0}^{i=nn-s} e^{-(t-t_i)^2} e^{-\left((a-a_i)^2 + (b-b_i)^2\right)}$$

wherein when the set of the magnitudes of the motions of the blocks excluding predetermined s blocks from the n×n (n>0) adjacent blocks aligned in the order of the magnitude of the motion is represented to be $\{t_1, t_2, \ldots, t_{n\,n-s}\}$, t, $t_i$, and $(a_i, b_i)$ respectively represent the magnitude of the motion of the current block, the magnitude of an arbitrary block which belongs to the set, and the position of the block having $t_i$ in the image.

28. The method of claim 26, wherein, in the steps (b5) through (b7), the motion of the current block is normalized using the equation, $$t = \sum_{i=0}^{i=nn-s} \frac{t_i}{(t-t_i)^2} \left((a-a_i)^2 + (b-b_i)^2\right) \Bigg/ \sum_{i=0}^{i=nn-s} \frac{1}{(t-t_i)^2} \left((a-a_i)^2 + (b-b_i)^2\right)$$

wherein, when the set of the magnitudes of the motions of the blocks excluding predetermined s blocks from the n×n (n>0) adjacent blocks aligned in the order of the magnitude of the motion is represented to be $\{t_1, t_2, \ldots, t_{n\,n-s}\}$, t, $t_i$, and $(a_i, b_i)$ respectively represent the magnitude of the motion of the current block, the magnitude of an arbitrary block which belongs to the set, and the position of the block having $t_i$ in the image.

29. The method of claim 17, wherein after the step (b) further comprises the steps of:
   (b5) setting a weighted value with respect to each block adjacent to a current block to be normalized proportional to a similarity to the current block with respect to the magnitude of the motion and a distance from the current block;
   (b6) setting a larger weighted value to blocks vertically adjacent to the current block than to blocks horizontally adjacent to the current block;
   (b7) obtaining a weighted mean value between the current block and the adjacent blocks; and
   (b8) replacing the weighted mean value by the motion vector of the current block.

30. An apparatus for converting a two-dimensional image sequence into a three-dimensional image, comprising:
   a block motion measuring portion for measuring a motion vector of each block of a current image divided into blocks having a predetermined size using a previous image frame;
   a horizontal disparity generating portion for obtaining a horizontal disparity from the motion vector of each block according to the motion characteristic of the current image;
   an image generating portion for moving each block in a horizontal direction according to each horizontal disparity and generating a composite image;
   a post-processor for determining whether adjacent blocks belong to the same subject using the brightness characteristic of each block in the current image and post-processing the composite image according to the result; and
   an outputting portion for displaying a three dimensional image comprised of the current image and the post-processed composite image.

31. The method of claim 17, wherein after the step (b) further comprises the steps of:
   (b5) setting a weighted value with respect to each block adjacent to a current block to be normalized proportional to a similarity to the current block with respect to the magnitude of the motion and a distance from the current block;
   (b6) obtaining a weighted mean value between the current block and the adjacent blocks; and
   (b7) replacing the weighted mean value by the motion vector of the current block.

32. The method of claim 17, wherein after the step (b) further comprises the steps of:
   (b5) setting a weighted value with respect to each block adjacent to a current block to be normalized proportional to a similarity to the current block with respect to the magnitude of the motion and a distance from the current block;
   (b6) setting a larger weighted value to blocks vertically adjacent to the current block than to blocks horizontally adjacent to the current block;
   (b7) obtaining a weighted mean value between the current block and the adjacent blocks; and
   (b8) replacing the weighted mean value by the motion vector of the current block.

* * * * *